Sept. 17, 1968          J. BONNET          3,401,554

CLOSED-VOLUME PERMEAMETER

Filed Sept. 16, 1965          4 Sheets-Sheet 1

Sept. 17, 1968  J. BONNET  3,401,554
CLOSED-VOLUME PERMEAMETER
Filed Sept. 16, 1965  4 Sheets-Sheet 2

Sept. 17, 1968    J. BONNET    3,401,554
CLOSED-VOLUME PERMEAMETER
Filed Sept. 16, 1965    4 Sheets-Sheet 3

United States Patent Office 3,401,554
Patented Sept. 17, 1968

3,401,554
CLOSED-VOLUME PERMEAMETER
Jean Bonnet, Avignon, France, assignor to Commissariat
à l'Energie Atomique, Paris, France
Filed Sept. 16, 1965, Ser. No. 487,800
Claims priority, application France, Sept. 28, 1964,
989,517
2 Claims. (Cl. 73—38)

ABSTRACT OF THE DISCLOSURE

The mean pore radius of porous barriers having the same specific permeability are measured by applying a pair of differential pressures across the barriers and then measuring the time between the differential pressures, the value of the difference between the pressures being inversely proportional to this time and a measure of the mean pore radius.

---

This invention relates to a method for automatic measurement of the mean radius of pores of microporous membranes and to an apparatus for the practical application of said method, one of the most important applications of said apparatus being the control of barriers employed for separating the chemically identical hexafluorides from the different uranium isotopes.

One device for taking a measurement as defined above is already known. However, although this apparatus is of signal service in the study of microporous barriers, it does not permit the possibility of operating with great rapidity and is therefore unfit for use when the characteristics of a large number of barriers have to be determined.

Figure 1:
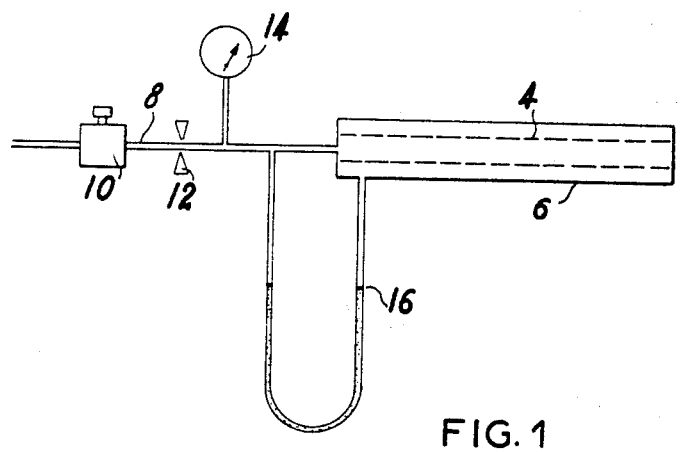

The structural design of a permeameter of this type as shown in FIG. 1 will be summarized hereunder.

The porous barrier 4 to be studied is placed within a vessel 6. Said vessel is supplied through a pipe 8 in which is mounted an expansion valve 10 and a nozzle 12 which operates at sonic velocity throughout the measurement, with the result that the gas flow introduced within the vessel is constant. An absolute manometer 14 measures the pressure upstream of the barrier and this upstream pressure is caused to coincide during the measurement with the means pressure applied to the barrier as a result of the low pressure differences to which the barrier walls are subjected. A U-tube differential manometer 16 indicates this difference $\Delta p$ between upstream and downstream pressure.

If the permeability of the barrier is designated as G, the gas flow through the barrier is designated as D, the area of said barrier is designated as S, and $\Delta p$ has the same definition as previously given, we may write:

$$G = \frac{D}{\Delta p \times S}$$

and it is established that, in the closed-volume permeameter, G is proportional to $1/\Delta p$.

In the case of a composite microporous wall or membrane, the variation of G is a linear function of the mean pressure $\bar{p}$ when this latter is sufficiently high (approximately 2 kgs./cm.² if the measuring gas is dry air). We may in that case write:

$$\frac{1}{\Delta p} = a\bar{p} + b \quad (1)$$

Figure 2:
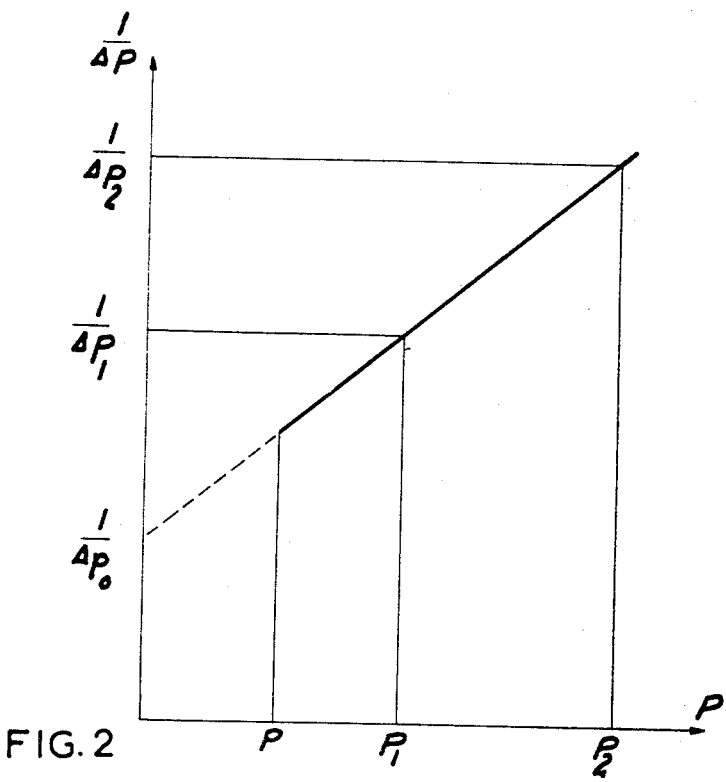

FIG. 2 shows a straight line which represents the variation of the reciprocal of the differential pressure $1/\Delta p$ (plotted as ordinates) as a function of the mean pressure $\bar{p}$ (plotted as abscissae).

Equation 1 shows that the gas flow through the pores of the membrane which can be assimilated with cylindrical channels is established as the sum of a corresponding number of flows in the laminar and molecular state. The coefficients $a$ and $b$ are therefore respectively a function of the 4th power and 3rd power of the mean radius $\bar{r}$ and this latter is given by the expression:

$$\bar{r} = K\frac{a}{b} \quad (2)$$

this formula being equivalent, as can be seen from FIG. 2, to $$\bar{r} = k \frac{1}{\bar{p}_2 - \bar{p}_1} \cdot \frac{\frac{1}{\Delta p_2} - \frac{1}{\Delta p_1}}{\frac{1}{\Delta p_0}} \quad (3)$$

The measurement of the mean radii of pores therefore makes it necessary as a rule to take a measurement of the differential pressures $\Delta p_1$ and $\Delta p_2$, then to plot the straight line $1/\Delta p = f(\bar{p})$ which defines the value $1/\Delta p_0$, and then finally to calculate the value of $\bar{r}$ from Formula 3.

When the barriers to be studied have identical specific permeabilities (permeabilities having zero means pressure), the mean pressures $\bar{p}_1$ and $\bar{p}_2$ which are applied in respect of similar values $\Delta p_1$ and $\Delta p_2$ of the differential pressure vary as a function of the mean radius of the barrier to be studied and we then have the simple relation:

$$\bar{r} = K\frac{1}{\bar{p}_2 - \bar{p}_1} \quad (4)$$

K being defined by the expression:

$$K = k\frac{\frac{1}{\Delta p_2} - \frac{1}{\Delta p_1}}{\frac{1}{\Delta p_0}}$$

It would be possible by satisfying this condition to contemplate a rapid method of measurement of the mean radius of pores by taking a measurement of the mean pressures applied in respect of two predetermined values of differential pressure. However, in practice, the specific permeabilities are variable and the lengthy procedure described above must be employed in order to take a measurement.

The present invention has for its object a method and device which permit the possibility, irrespective of the specific permeability of the barrier being studied, to associate the value of the mean pore radius directly with the measurement of the difference in mean pressures as indicated in relation 4.

The method of measurement of the mean radius of pores of a microporous membrane by means of the closed volume permeameter in accordance with the invention consists in measuring the difference $\bar{P}_2 - \bar{P}_1$ in the mean pressures applied in respect of differential pressures $\Delta p_1$ and $\Delta p_2$, the values of which are a function of the specific permeability of the barrier to be studied. These values $\Delta p_1$ and $\Delta p_2$ are chosen so that the ratio:

$$\frac{\frac{1}{\Delta p_2} - \frac{1}{\Delta p_1}}{\frac{1}{\Delta po}} \quad (5)$$

should remain constant.

In the method according to the invention, the choice of the values $\Delta p_1$ and $\Delta p_2$ between which the measurement must be taken in respect of a given barrier is guided by the observation of the permeability of this latter at a mean pressure $\bar{P}$ which is in the vicinity of zero and, in all cases, lower than the pressure $\bar{P}_1$ as applied in respect of the differential pressure $\Delta p_1$ which is chosen for the measurement. This mean pressure $\bar{P}$ is closer to zero according as the degree of accuracy required in the evaluation of $\bar{r}$ is greater. It is in fact assumed that all barriers having the same permeability at the pressure $\bar{P}$ have identical specific permeability irrespective of their mean pore radius.

The present invention is also directed to an industrial measuring apparatus for the practical application of the above method, wherein said apparatus comprises a plurality of measuring units which are each essentially composed: of a vessel divided into two sections assembled by means of a jack and containing the porous barrier to be studied, a sonic feed nozzle, an absolute manometer for measuring the pressure upstream of the barrier which is substantially equal to the mean pressure applied to this latter and a differential manometer for measuring the difference in pressures applied to said barrier, and is characterized in that, in each unit, photoelectric cells distributed along the low pressure branch of the U-tube differential manometer which forms part of each measuring station serve to locate the position of tre manometric liquid. As a result of the change of state of said photoelectric cells at the time of interposition of the liquid between said cells and the light source, said photoelectric cells initiate the forward motion of a step-by-step relay to the position corresponding to each cell. At the mean pressure $\bar{P}$, the relay is thus brought into the position in which it is associated with the highest cell reached by the manometric liquid. This cell corresponds to the value $\Delta p_1$ of measurement.

There is automatically coupled to said photoelectric cell another cell which represents the appropriate value $\Delta p_2$.

When, under the influence of the increase in permeability of the barrier to be studied, the manometric fluid drops to the level of the photoelectric cell which represents $\Delta p_1$, a time-counting operation starts and then stops when the liquid reaches the level of the cell $\Delta p_2$. The time indicated is in inverse ratio to the value of the mean radius inasmuch as the operation takes place at constant delivery, with the result that the difference $\bar{P}_2 - \bar{P}_1$ is proportional to the time.

In accordance with a preferred form of embodiment of the method according to the invention, the different units are subjected to identical and displaced cycles, one of the units being subjected to discharge-charge operations while the other units are subjected to measuring operations.

Aside from the main characteristic features which have just been specified, other secondary features relating to the mode of construction will be indicated later.

The apparatus in accordance with the invention is advantageous since it makes it possible to effect the measurements of mean radii of a large quantity of microporous membranes in a very short time.

In order that the technical characteristics of the present invention may be more readily understood, one example of embodiment thereof will now be described, it being understood that said form of embodiment does not have any limitative character either in regard to the modes of operation or the uses to which it may be applied.

Figure 3:
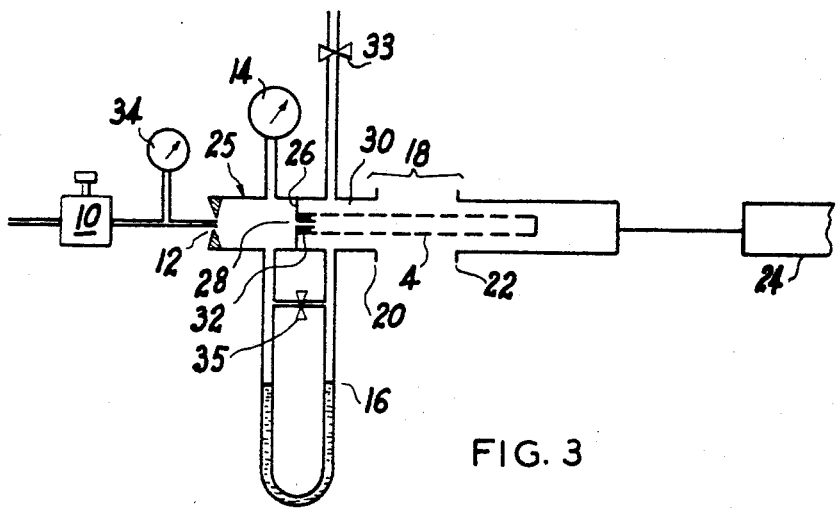
Figure 6:
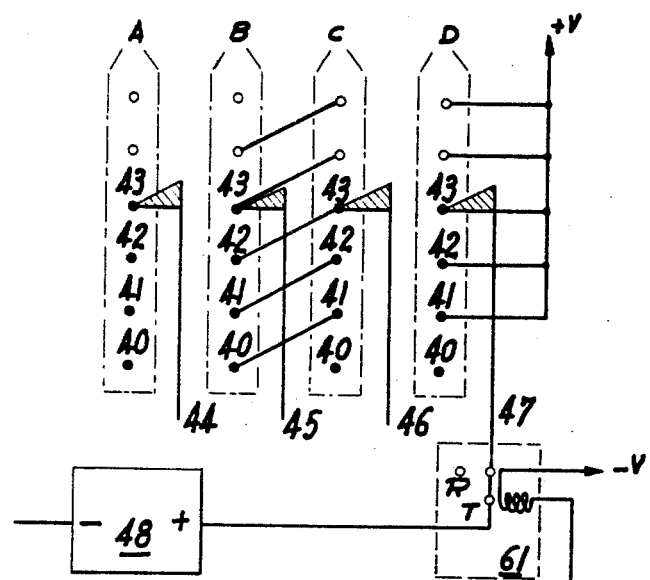
Figure 4:
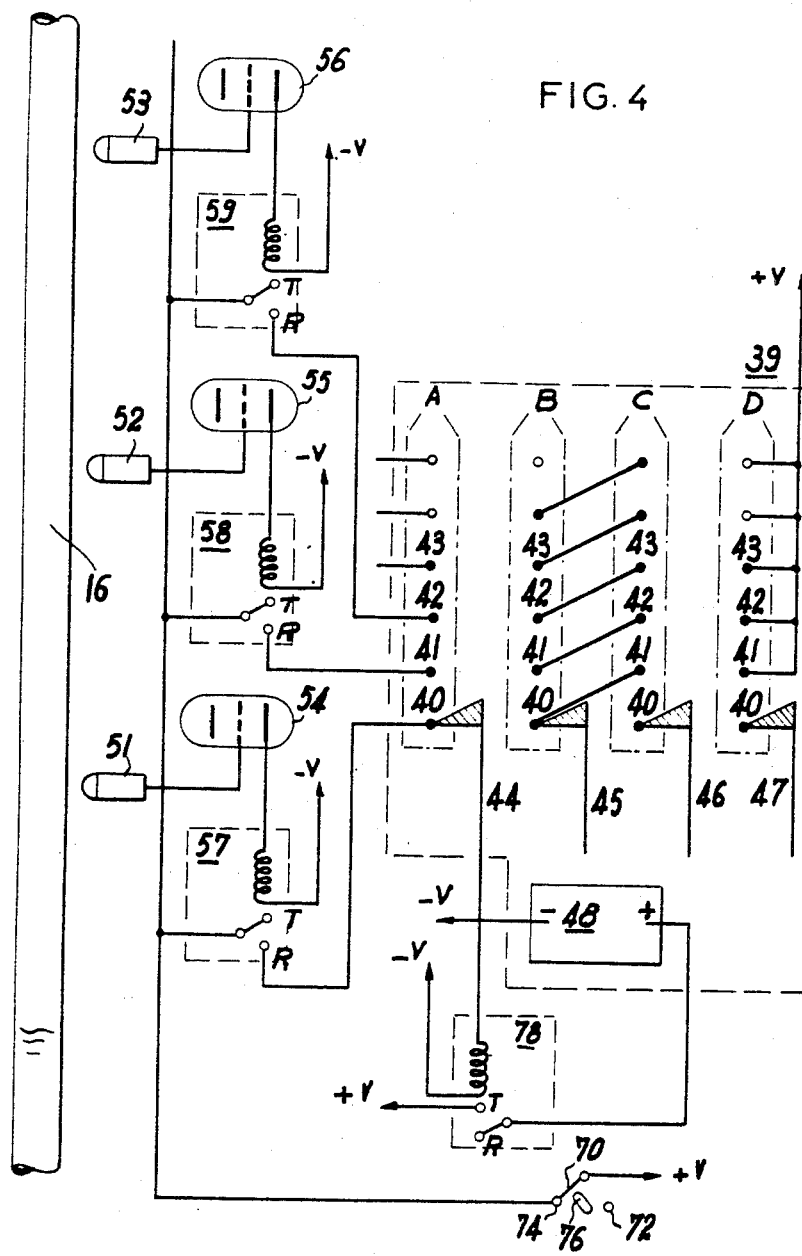
Figure 5:
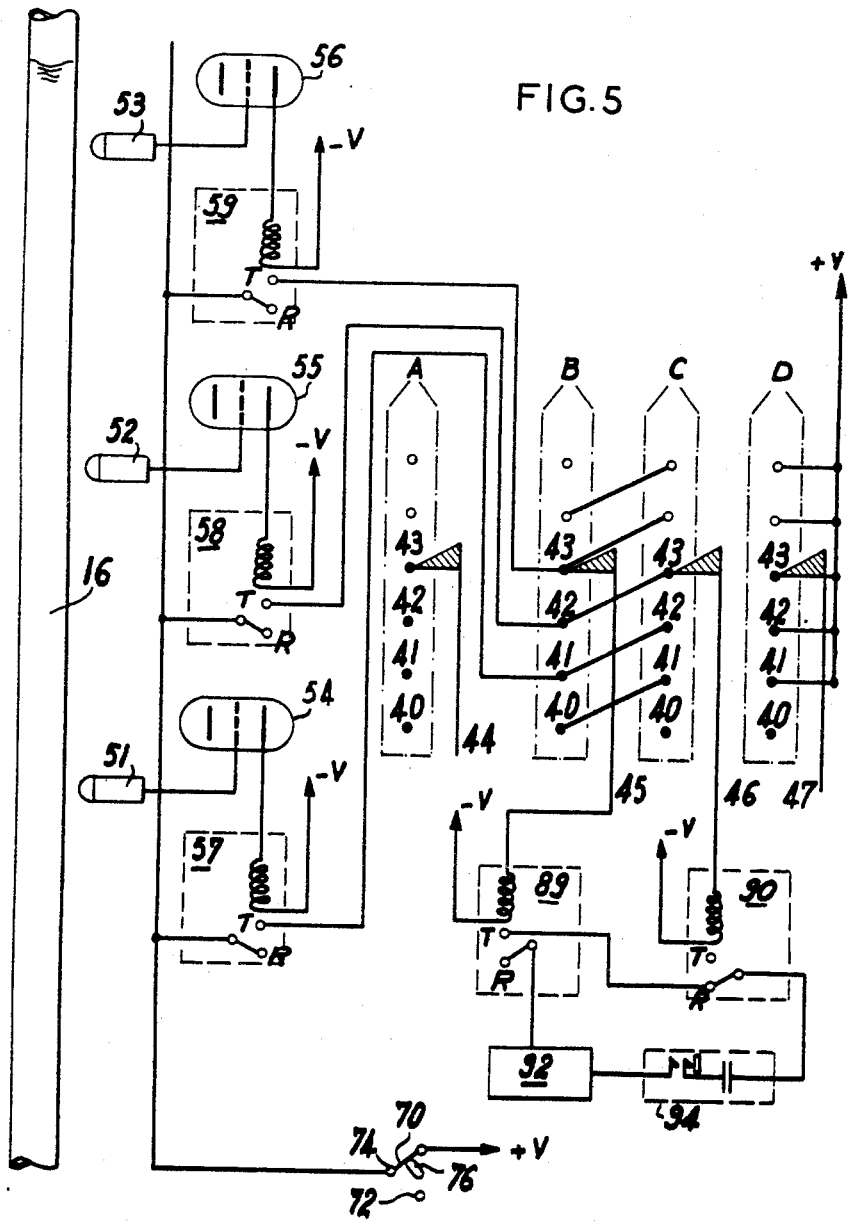

FIG. 3 is a diagram which represents one measuring unit. FIG. 4 represents the electric system which serves to determine automatically, as a function of the permeability of the barrier, the $\Delta p$ values which will serve for the measurement. FIG. 5 shows the diagram of the time-counting system which carries out the measurement proper of the mean pore radius. FIG. 6 is a diagram of the device for resetting the selector relay to zero for the purpose of carrying out another operation.

FIG. 3 represents a measuring station as employed in accordance with the invention. Said station comprises elements which are identical with the apparatus of FIG. 1. Said elements are designated by the same reference numerals in both figures.

The porous barrier 4 is contained within a vessel 18 consisting of two sections 20 and 22 which are assembled at the commencement of the measuring operation by operating the member 22 by means of the jack 24. The member 20 of the unit 18 consists of two compartments 25 and 30. The feed pipe opens into the upstream compartment 25. Said upstream compartment is connected to the manometer 14 for measuring the mean pressure as well as to one of the ends of the U-tube differential manometer 16 and limited by a wall 26 pierced by a conduit 28 which opens into the internal space of the porous barrier. The downstream compartment 30 limited by the wall 26 to which is secured a support 32 for the porous barrier is connected to the second extremity of the U-tube manometer. Said downstream compartment is also provided with a pipe fitted with an electrovalve 33 for providing a communication with the exterior of the vessel 18. The two branches of the U-tube manometer are put into communication by means of a pipe fitted with an electrovalve 35 which, in delivery and at the end of measurement, serves to equalize the upstream and downstream pressures instantaneously.

Photoelectric cells which indicate the measurement values $\Delta p_1$ and $\Delta p_2$ are spaced at intervals along the low-pressure branch of the manometer 16. The number of said photoelectric cells is limited, and is all the greater in respect of a same range of values of permeabilities of barriers to be measured as it is desired to ensure greater accuracy in the evaluation of the means pore radius. In order to limit the number of cells, it is not only assumed that all of the barriers having the same permeability at the mean pressure $\bar{P}$ have identical specific permeability but also that all of the barriers having a permeability which is immediately higher than said pressure P also have said specific permeability. Steps are additionally taken to ensure that each end-of-measurement value $P_2$ of a given range of permeabilities at the pressure P is the beginning-of-measurement value $P_1$ in respect of the range which is immediately higher. The difference between the photoelectric cells is such that it verifies the relation:

$$\frac{\frac{1}{\Delta p_2} - \frac{1}{\Delta p_1}}{\frac{1}{\Delta po}} = \text{constant}$$

The apparatus comprises four similar measuring stations. Each station is subjected to cyclic operations, each operation being displaced by one station relatively to the other. There will thus be obtained first a discharge-charge stage which lasts one quarter of a cycle, followed by the putting of the station in closed volume, the selection of the measurement values $\Delta p$, the measurement proper, the return of the measurement station to free air and once again the discharge-charge stage.

Only the last operation referred-to requires the intervention of the operator who places the barrier in position on the support 32. All of the other operations are performed automatically and are controlled by cams controlled by a reduction gear motor.

There will now be described by means of the diagram of FIG. 4 the operation which involves selection of the $\Delta p$ measurement values.

The step-by-step selector relay 39 consists of four stationary wafers A, B, C, D each comprising the contact-studs 40, 41, 42, 43 . . . and moving contacts 44, 45, 46, 47, which move together from one contact-stud to the other under the impulse of a motor 48 which is supplied with direct current at a voltage V. At the beginning of the measuring cycle, the moving contacts are positioned on the contact-studs 40.

There has been shown in FIG. 4 the low-pressure branch of the differential manometer 16, the manometric liquid being located in the position which represents zero differential pressure. Only three photoelectric cells 51, 52, 53 have been shown, athough any number may be provided. The device for illuminating said photoelectric cells is not shown in the figure.

The said photoelectric cells 51, 52, 53 control respectively the grid voltage of thyratrons 54, 55, 56. When there is no liquid between the light source and the photoelectric cells, said thyratrons are energized and each one applies voltage to the relay coils 57, 58, 59, the stationary contacts of which are connected to the contact-studs 40, 41, 42, of the wafer A of the selector relay.

The relays 57, 58, 59 can energize the coil of a relay 78 by means of the moving contacts 44 which is in the rest position by closing a direct current circuit which is connected to the negative terminal of a voltage source V, said circuit being additionally connected to the positive terminal of the same source as a result of closure of a contact 70 under the influence of the cam 76 which carries out this closure only during the measurement cycle.

When the liquid reaches the level of the photoelectric cell 51 at the beginning of the measurement cycle under the influence of the differential pressure, said photoelectric cell records this change of state and initiates the blocking of the thyratron 54. The coil of the relay 57 is de-energized and this latter changes over to the rest position. The coil of the relay 78 is energized. Said relay changes over to the working position, thereby closing a direct current circuit having a voltage V which supplies the motor 48 of the selector relay. The moving contacts then move forward over the contact-studs 41, thus producing the opening of the supply circuit to the relay 78, the change-over of said relay to the rest position and consequently the opening of the supply circuit to the motor 48.

The same operation takes place when the liquid reaches the level of the cell 52. The moving contacts are brought onto the contact-studs 42. As the fluid passes in front of the photoelectric cell 53, the moving contacts will accordingly come into position over the contact-studs 43. If said photoelectric cell is the last to be reached by the liquid, said cell is chosen for the purpose of indicating the value $p_1$ of the differential pressure of the begining of measurement. A connection between contact-stud 42 of wafer B of the selector relay and contact-stud 43 of wafer C selects, as will be explained below, the photoelectric cell 52 in order to indicate the value $\Delta p_2$ of the differential pressure of the end of measurement.

The diagram of FIG. 5 explains the time-counting operation which constitutes the measuring operation proper for measuring the mean pore radius.

At the beginning of measurement, the moving contacts 44, 45, 46, 47, are positioned in front of the contact-studs 43 of the wafers A, B, C, D of the selector relay 39. The working contacts of the relays 57, 58, 59, are connected respectively to the contact-studs 41, 42, 43, of wafer B of the selector relay and this connection makes it possible by means of the moving contact 45, to energize the coil of a relay 89 as shown in FIG. 5, the change-over of which to the working position closes a circuit comprising a pulse generator 94 and a pulse counter 92.

When the manometric liquid falls into the low-pressure branch of the differential manometer under the influence of the increase in permeability of the barrier being studied, the photoelectric cell 53 records the drop in level. The thyratron 56 is energized, thus applying voltage to the coil of the relay 59. Said relay changes over to the working position. The circuit which supplies current to the coil of the relay 89 is closed. Said relay changes over to the working position; and the pulse counting starts.

When the liquid reaches the photoelectric cell 52, the coil of a relay 90 is energized, this latter being connected to the circuit having a voltage V by means of the moving contact 46 of the connection between the contact-stud 43 of wafer C and the contact-stud 42 of wafer B of the selector relay and the working contact of the relay 58, this latter being in the working position as a result of the change of state of the photoelectric cell 52.

The relay 90 changes over to the working position, then opens the pulse counting circuit, and the counting stops. The value which is recorded on the pulse counter is in inverse ratio to the mean pore radius of the barrier which is being studied.

At the end of the measurement cycle, the selector relay is reset to zero so as to permit a further measurement.

FIG. 6 represents the system which is employed for automatic resetting.

The contact-studs of the wafer D of the selector relay 39 are connected to the positive terminal of a direct current source having a voltage V with the exception of the contact-stud 40. By means of the working contact of a relay 61, the moving contact 47 of the selector relay can close the circuit having a voltage V which supplies current to the motor 48 of the selector relay by way of the contact-studs of wafer D. The coil of the relay 61 is energized through a circuit closed by the contact 70 which the cam 76 has brought at the end of measurement onto the contact-stud 72. A pulse generator 62 is placed in this circuit.

When the contact 70 comes into position 72, the coil of the relay 61 is energized by pulses. At each pulse, the contact of said relay changes over to the working position. The current having a voltage V is then supplied to the motor 48, thereby initiating the forward motion of the moving contacts over the contact-studs which follow the contact-stud 43 up to the contact-stud 40. At this moment, the circuit for supplying current to the moor is opened since the contact-stud 40 is not connected to the voltage source. The moving contacts remain in the position 40 of the beginning of measurement.

During the charge-discharge stage of the measuring station, the cam 76 brings back the contact 70 to position 74. The initial conditions shown diagrammatically in FIG. 4 are again restored.

What I claim is:

1. Industrial measuring apparatus comprising a plurality of measuring units each including a vessel containing the porous barrier to be studied, a sonic nozzle and a differential manometer having a low pressure branch for measuring the difference in pressures in the gas applied to the said barrier, photoelectric cells in each measuring unit spaced at intervals along said low pressure branch, a step-by-step selector relay, said photoelectric cells controlling the position of said step-by-step selector relay in such a manner that the said relay corresponds to the highest photoelectric cell which detects the presence of the manometric liquid, and a counting device triggered by the passage of the level of liquid within the manometer in downward motion in front of the highest photoelectric cell which defines $\Delta P_1$ and blocked as the level of liquid passes in front of the photoelectric cell which corresponds to the value $\Delta p_2$, the counting being proportional to the difference $\overline{P}_2 - \overline{P}_1$.

2. Industrial measuring apparatus according to claim 1, wherein the highest photoelectric cell which detects the presence of the manometric liquid within the manometer measures a value of $\Delta p$ which is considered as the value $\Delta p_1$ of the beginning of measurement and another photoelectric cell which defines the value $\Delta p_2$ of $\Delta p$ at the end of measurement is automatically associated therewith by connection in said step-by-step relay.

References Cited
UNITED STATES PATENTS 3,256,732  6/1966  Gremion _____ 73—38
3,301,042  1/1967  Eyraud et al. _____ 73—38

S. CLEMENT SWISHER, *Acting Primary Examiner.*

WILLIAM HENRY, *Assistant Examiner.*